United States Patent [19]

Ilse

[11] 4,252,493
[45] Feb. 24, 1981

[54] METHOD AND APPARATUS FOR RECEIVING BULK PARTICULATE MATERIALS INVOLVING DUST CONTROL AND REDUCED AIR CONTAMINATION

[75] Inventor: Peter E. Ilse, San Jose, Calif.

[73] Assignee: Owens-Corning Fiberglas Corporation, Toledo, Ohio

[21] Appl. No.: 25,299

[22] Filed: Mar. 30, 1979

[51] Int. Cl.³ .................... B65G 67/24; B65G 69/18
[52] U.S. Cl. .................................. 414/573; 141/93;
141/325; 198/538; 198/540; 198/548; 198/550;
198/558; 222/564; 414/291; 414/292; 414/786
[58] Field of Search ............... 414/291, 292, 293, 572,
414/573, 574, 786; 198/538, 540, 548, 550, 558;
141/93, 325, 392; 222/457, 547, 564

[56] References Cited

U.S. PATENT DOCUMENTS

| | | | |
|---|---|---|---|
| 1,867,489 | 7/1932 | Bennett et al. | 198/548 X |
| 2,642,206 | 6/1953 | Reed | 222/457 X |
| 2,813,640 | 11/1957 | Loomis | |
| 2,957,608 | 10/1960 | Wahl | 198/548 X |
| 3,411,462 | 11/1968 | Mathison | |
| 3,528,570 | 9/1970 | Pase | |
| 3,802,584 | 4/1974 | Sackett | 198/538 X |
| 3,985,245 | 10/1976 | Schulte | 414/291 X |
| 4,057,152 | 11/1977 | Weaver | 198/538 X |

Primary Examiner—Leslie J. Paperner
Attorney, Agent, or Firm—Ronald C. Hudgens; Patrick P. Pacella; Harry O. Ernsberger

[57] ABSTRACT

The disclosure embraces a method of and apparatus for receiving bulk particulate materials from a material supply carrier into a hopper construction in which the hopper construction includes a multicellular or multitubular arrangement providing for free flowing of the material through the cells or tubes into a hopper chamber, the tubular or cellular construction being provided with a central conically-shaped void or space defined by certain of the tubes or cells being of varying lengths whereby the angle of the conically-shaped void simulates a natural angle of repose of the particulate material so that the particulate material in the hopper chamber and in the void or space seals the tubes or cells preventing cross winds or moving air from affecting or entraining the material thereby minimizing or substantially eliminating loss of the material and contamination of the environment by the material.

19 Claims, 3 Drawing Figures

4,252,493

METHOD AND APPARATUS FOR RECEIVING BULK PARTICULATE MATERIALS INVOLVING DUST CONTROL AND REDUCED AIR CONTAMINATION

This invention relates to a method and apparatus particularly for use in unloading and receiving particulate or comminuted bulk materials from supply carriers such as hopper trucks or hopper railway cars into a receiving hopper construction configured to prevent the escape and air entrainment of the particulate materials and reduce contamination of the environment during material unloading operations.

Industrial establishments, such as glass processing companies, chemical companies and companies handling particulate materials, receive flowable particulate or comminuted materials in bulk from supply carriers such as hopper railway cars and trucks but the transfer of such bulk materials from the railway cars and trucks has not been satisfactory because during transfer the particulate materials have been subjected to moving air or cross winds which entrain fine particles of the materials and contaminate the atmosphere or environment as well as resulting in an economic loss in the operation.

For example, glass processing companies receive bulk glass batch, which comprises several ingredients in fine particle or particulate form and, during the flow or transfer of the glass batch from a car or truck into a receiving hopper, the dust-like particles escape and contaminate the atmosphere. The methods of transfer of such bulk materials that have been heretofore used have not provided adequate control so as to attain transfer of the material from the supply carrier into a receiving hopper without substantial losses of particles of the materials which consequent contamination of the environment.

An object of the invention resides in a method of receiving bulk particulate material into an open-ended cellular structure associated with a receiving hopper wherein a central region of the cellular construction is a conically-shaped void or space simulating the angle of repose of a pile formed by free flowing particulate material and wherein the cells of the unit retain or entrap particulate material effecting a sealing of the cells adjacent the main stream flow of material through the void whereby moving ambient air or cross winds do not affect the particulate material so that particle dust generation is prevented or minimized with no appreciable loss of the particulate material thereby reducing or eliminating contamination of the environment.

Another object of the invention resides in the provision of a material receiving hopper embodying a multitubular or multicellular construction which receives the particulate material from a supply carrier or vehicle, the central region of the multitubular or multicellular construction being a conically-shaped void or space defined by tubes or cells of varying lengths, the defined shape simulating a cone-shaped angle of repose of the particulate material accumulating in the hopper chamber and tubular or cellular construction whereby the particulate material in the tubes or cells provides a seal preventing loss of the material by air movement or cross winds in the environment.

Another object of the invention resides in a receiving hopper construction for bulk particulate materials embodying a tubular or cellular assembly or unit provided by a large number of open-ended tubes, tubular configurations or cells forming a honeycomb-like cellular structure wherein the tubes or cells have their lower ends substantially closed by the particulate materials forming seals to prevent loss of the materials from the hopper construction.

Another object of the invention resides in a receiving hopper and multitubular or multicellular construction which is movable into contact with the materials delivery outlet of a supply hopper or delivery chute of a railway car hopper or a hopper truck, the multicellular or multitubular construction having a central void preferably of truncated cone-shaped configuration simulating the angle of repose of the material which builds up in the hopper construction, the material sealing the lower ends of the tubes, tubular configurations or cells defining the truncated cone-shaped void to prevent loss of the particulate material and to prevent moving air or cross winds from entraining the material and contaminating or polluting the atmosphere or environment.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawing of a form of the invention, which may be preferred, in which.

Figure 1:
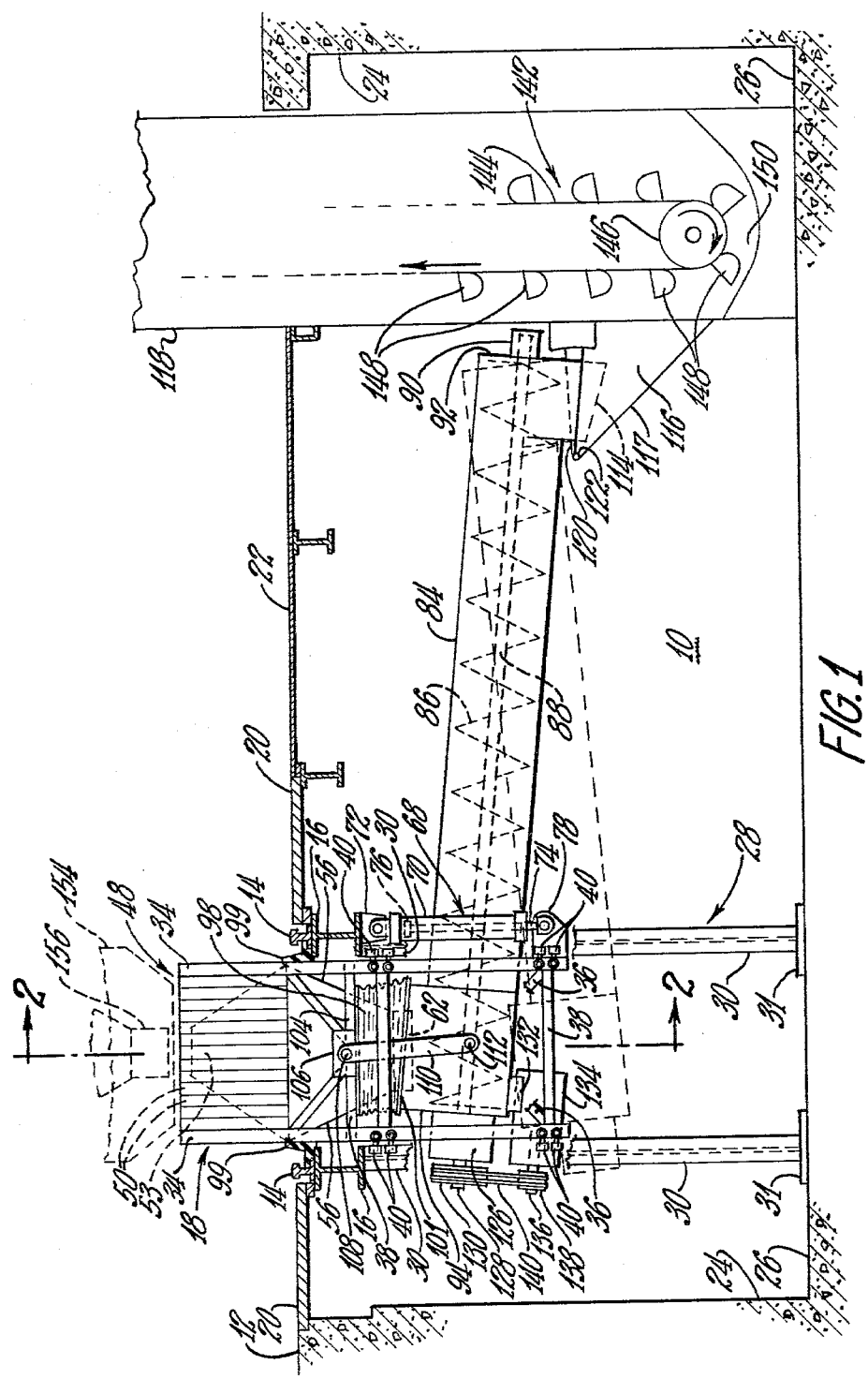
FIG. 1 is a semischematic elevational view of a receiving hopper and multitubular or multicellular assembly in elevated position to receive particulate material in association with a conveyor for transferring the particulate material from the receiving hopper.

The form of material-receiving hopper construction of the invention illustrated in the drawings is particularly usable in receiving bulk glass batch which comprises particulates of several ingredients, some of which are very fine dust-like particles, but it is to be understood that the method and apparatus of the invention may be utilized for receiving other bulk particulate materials from supply carriers such as railway hopper cars or hopper or gated trucks, particularly bulk materials that have fine particle ingredients.

FIG. 1 is illustrative of a form of the invention installed in a pit wherein bulk particulate material is delivered into a receiving hopper from a railway hopper car, a hopper-type truck or a gated truck and the material conveyed from the receiving hopper for further processing.

The material receiving and transferring construction is disposed in a walled pit 10 which is below ground level 12. Disposed adjacent ground level are rails 14 of a conventional railway track, the rails being supported upon structural members such as I beams 16. The rails accommodate railway hopper cars which contain particulate bulk materials, such as glass batch, to be delivered to the receiving hopper construction 18.

Arranged at each side of the track rails 14 are thick metal pavement plates or other roadway construction 20 which form a portion of a roadway to accommodate hopper trucks or gated trucks which may be utilized in delivering bulk particulate materials to the receiving hopper construction. A removable metal plate or member 22 forms a cover for a portion of the pit 10 providing access to the mechanism contained within the pit. The pit 10 is lined with concrete side walls 24 and a concrete floor 26.

The material receiving hopper construction and associated mechanism are supported upon a frame structure 28 which, in the embodiment illustrated, includes four vertical structural members or columns 30, the lower ends of the columns provided with plates 31 mounted on the concrete floor 26, the columns 30 being broken away for purposes of illustration of other mechanism. The columns 30 provide additional support for the I beams 16.

The receiving hopper construction 18 is of substantially square configuration in horizontal cross section and is inclusive of a frame construction comprising four vertically disposed corner posts or members 34, two of which are illustrated in FIG. 1. The pairs of posts or members 34 are connected by diagonally arranged struts 36, portions of which are shown in FIG. 1 and by horizontally arranged strut members 38 to provide a rigid hopper construction.

Figure 2:
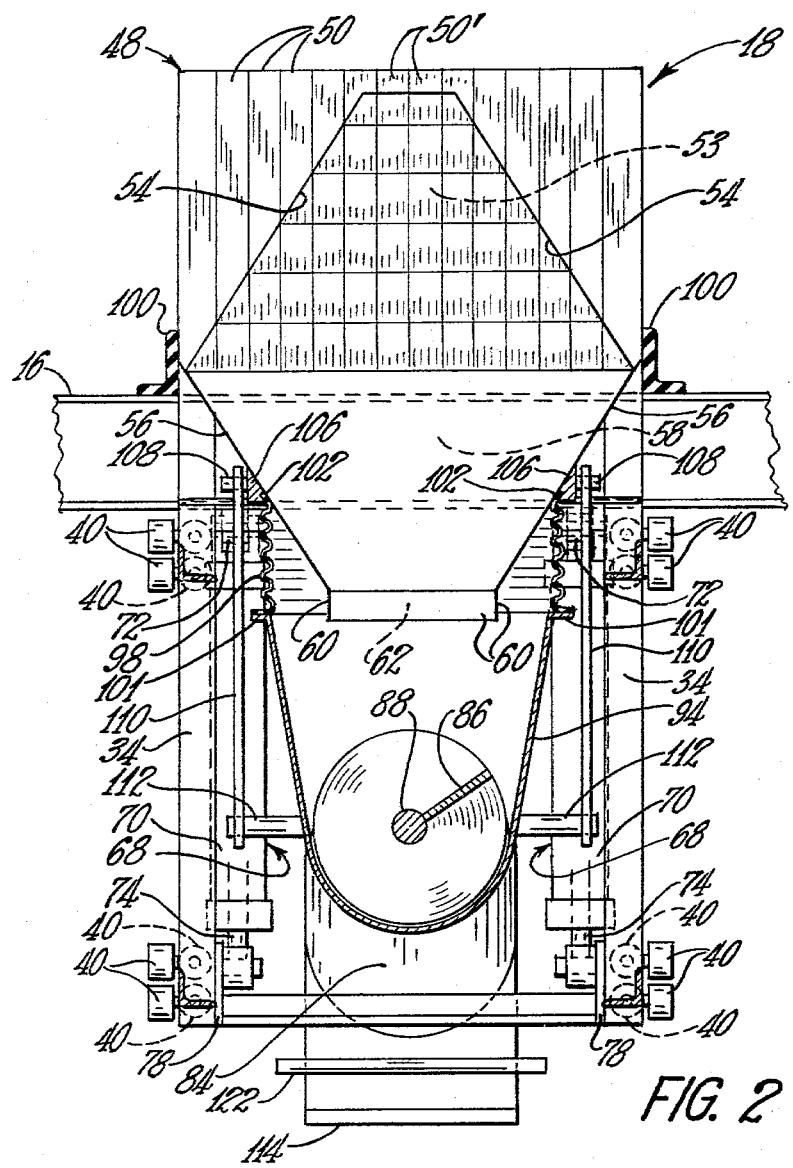
FIG. 2 is a transverse sectional view through the hopper and cellular unit construction, the view being taken substantially on the line 2—2 of FIG. 1.

Each of the four corner posts or members 34 of the hopper construction is equipped with pairs of rollers 40, as shown in FIGS. 1 and 2, the rollers being journally mounted in bearing constructions carried by the hopper frame corner posts 34. The rollers 40 engage the vertical columns 30 which form a vertical track means for the rollers whereby the hopper construction 18 is vertically movable.

The material receiving hopper construction 18 mounted by the vertically disposed corner posts or members 34 is fashioned to reduce loss of particulate materials being handled and thereby reduce or eliminate contamination or pollution of the atmosphere by particulate materials that might otherwise be entrained in air movements or cross winds at the region of delivery of particulate materials into the hopper. It is well known that when particulate materials are flowed from a discharge outlet into a pile of the materials, the material automatically seeks an angle of repose whereby the pile of material resembles a conical formation.

The material will form a pile, the exterior surface of which forms an angle at which the material will no longer be retained but will coast downward and, if material flow continues, will increase the size of the pile but the exterior defining surface of the pile will be the angle of repose at which the material will be retained at the conical surface. The angle of repose of any particulate bulk material is the angle with the horizontal at which the material will stand when piled. Most particulate materials such as glass batch have an angle of repose of from about thirty five degrees to forty degrees.

Figure 3:
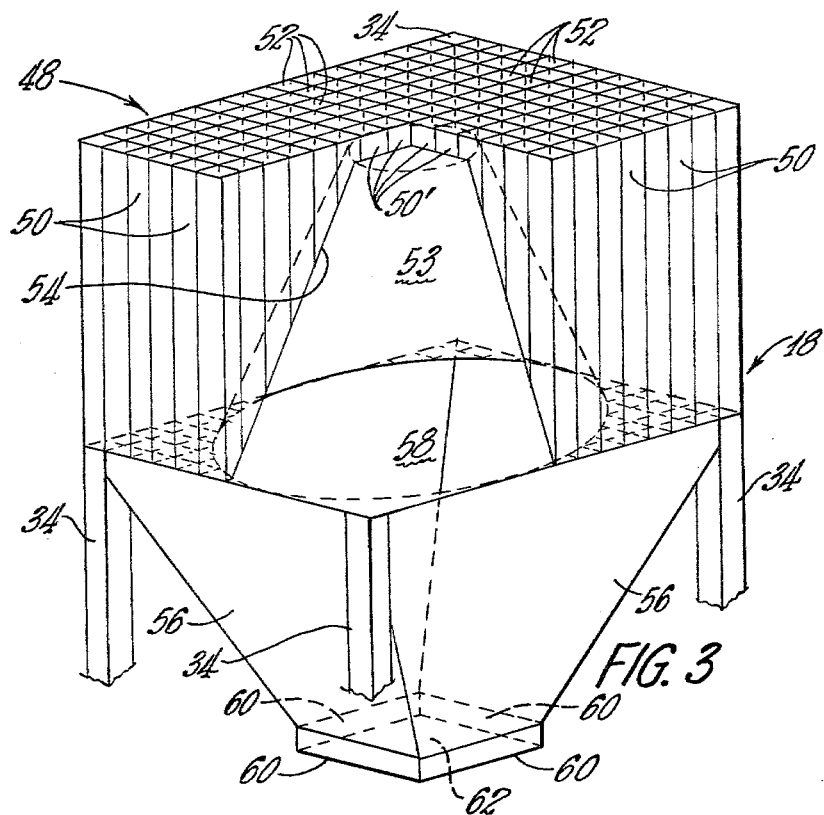
FIG. 3 is an isometric view showing one form of the material receiving hopper and cellular construction of the invention.

With particular reference to FIG. 3, illustrating a form of the hopper construction, the construction includes a multitubular or multicellular unit or assembly 48 which is fashioned of a large number of tubes 50 which form vertical passages or open-ended cells 52. The substantially square assembly 48 of tubes is of a length and width greater than the length and width of any material discharge outlet of a supply hopper on a hopper car or the outlets of a hopper truck or a gated truck. Thus the upper surface area of the square unit 48 is of sufficient dimension to receive any stream of bulk particulate material from a railway car, truck or other material supply carrier or conveyance. The upper surface of the multicellular or multitubular unit or assembly 48 is adapted for sealing engagement or registration with the material discharge outlet of a supply carrier.

The length of most of the tubes of unit 48 are equal to the height of a simulated pile of particulate material delivered through the tubes at the central region of the unit. The tubes are of varying lengths or are cut away interiorly of the unit to form a space or void 53, the shape of the void being frusto-conical with the angle 54 of the conical surface being substantially the same as the angle or repose of the free flowing particulate material being collected in a pile.

The size or cross sectional area of a tube may be of a dimension to accommodate the particulate material to be received by the hopper construction so that the material will be free flowing through the cells or passages of the unit. In utilizing the hopper construction for receiving glass batch or similar particulate material the tubes 50 of square configuration may be between two inches and six inches on a side.

It has been found that in unloading glass batch material that a unit having tubes which are four inches on a side has been satisfactory. It is to be understood that the tubes may be of different cross sectional configuration such as a round tube or a hexagonal tube or the like of a size sufficient to provide for free flow of the particulate material through the tubes or cells. If desired, the tubular or cellular unit may be fashioned of strips or sheets of corrugated material in which the peaks or crests of the strips may be welded together to form a cellular or honeycomb-like construction.

Secured to the lower outer edges of the tubular or cellular unit 48 are inwardly and downwardly tapered side walls 56 as shown in FIG. 3 and defining a hopper chamber 58 beneath the cellular unit 48. The walls 56 converge into walls 60, the latter forming a substantially square outlet 62 for the hopper.

All of the tubes 50 or the cells 52 provided by the tubes are open-ended, the lower ends of the tubes or cells being in communication with the hopper chamber 58. The tubes or cells at the upper central region of the tubular or cellular assembly are of short length as indicated at 50', the lower edges of the short length tubes or cells lying in a horizontal plane and defining the conically-shaped space 53 as frusto-conical or truncated cone shape. It is to be understood that the short length tubes 50' may be dispensed with without impairing the functioning of the tubular or cellular unit or assembly 48 of the hopper construction 18.

As the tubes of varying lengths defining the frusto-conical configuration are open-ended, the material, upon accumulating in the hopper chamber 58 and in the frusto-conically shaped void 53, flows into the lower open ends of the tubes of varying lengths, the material in these shorter length tubes forming seals which prevent air movement through such cells or tubes. The material accumulated in the chamber portion 58 of the hopper seals off the lower ends of the tubes 50 so that the tubes outside of the scope of the base of the frusto-conical shaped void 53 are sealed by the particulate material.

Through this arrangement the particulate material in the hopper chamber 58 and in the tubes is sealed against movement of the ambient air or cross winds so that all of the material delivered from a railway hopper car, hopper truck or other supply conveyance is not entrained in any moving air and hence there is no appreciable loss of the material and contamination or pollution of the environment is substantially eliminated or greatly reduced.

Means is provided for elevating and retracting the hopper construction 18 into and out of engagement with the hopper delivery outlet of a railway hopper car, hopper truck or the like. With particular reference to FIG. 2, fluid-operated motive means is provided for elevating and retracting the hopper construction 18. In the embodiment illustrated, the fluid-operated motive means 68 comprises two cylinders 70, one end of each cylinder 70 being pivotally anchored to a bracket means 72 mounted by the I beams 16.

Piston rods 74 extend into the cylinders and each piston rod is equipped with a piston 76, one of the pistons being shown in broken lines in FIG. 1. Secured to two of the corner posts 34 of the hopper frame construction are brackets 78 to which the piston rods 74 are pivotally anchored. Fluid pressure, such as oil under pressure or compressed air, applied below the pistons 76 in the cylinders 70 elevates the hopper construction 18 to the position shown in FIGS. 1 and 2. Fluid pressure entering the cylinders above the pistons 76 retracts the hopper construction 18 to its lowermost or out-of-use position.

The arrangement includes means for receiving the particulate bulk material, such as glass batch, from the hopper chamber 58 and transferring the same for further processing. Disposed in and extending lengthwise of the pit 10 is a tubular member or housing 84 in which is rotatably mounted a screw-type conveyor 86 having an axial shaft portion 88. The right-hand end of the screw conveyor shaft 88 is journally mounted in a bearing 90 supported by an end wall 92 of the screw conveyor housing 84.

The other end region of the housing 84 is provided with an enlargement or receptacle portion 94, the upper portion of the enlargement 94 being adapted to receive particulate material from the hopper construction 18 through the discharge outlet 62. The receptacle portion 94 is of square cross section at its upper end region. An accordian-type flexible rubber sealing boot or member 98 is disposed between the tapered walls of the hopper chamber 58 and the receptacle portion 94. The lower end of the flexible boot 98 is in sealing engagement with a flange 101 at the entrance of the receptacle portion 94.

Surrounding the angularly disposed walls 56 of the hopper construction is a square frame 102, the inner surface of which snugly engages the walls 56 of the hopper to form a seal therewith. The upper end of the flexible boot 98 is secured to the frame 102. In this manner the flexible boot 98 provides a seal between the receptacle portion 94 of the conveyor housing 84 and the exterior surfaces of the side walls 56 of the hopper construction, irrespective of the relative vertical position of the hopper.

The square frame 102 is secured to laterally extending reinforcing struts or members 104, shown in FIG. 1, the members 104 being secured to the corner posts 34 of the hopper construction. The central region of each member 104 is secured to a member 106. As shown in FIG. 2, each of the members 106 is provided with a pivot pin 108 and links 110 have their upper ends pivotally connected with the pins 108.

As shown in FIG. 1, disposed adjacent each of the track rails 14 are rubber sealing means or members 99 which engage one pair of opposed walls of the cellular unit 48 to effect a seal at these regions. As shown in FIG. 2, rubber sealing members 100 supported by I beams 16 engage the other pair of walls of the cellular unit 48 to effect a seal at these regions. The seals 99 and 100 prevent entrance of foreign matter into the pit 10.

The screw conveyor housing 84 adjacent the receptacle portion 94 is provided with laterally extending members or pins 112 and the lower ends of links 110 are pivotally connected with the pins 112. The right-hand end of the screw conveyor housing 84 has a generally rectangular hollow portion 114 through which the material from the screw conveyor is discharged into a feed hopper or chute 116 which is supported by a vertically disposed tubular material-elevating tower or shaft 118.

A wall portion of the material delivery outlet or hollow portion 114 is provided with a plate 120 which is hinged or pivoted as at 122 to the upper end of an end wall 117 of the chute 116 as shown in FIG. 1. Through the provision of the links 110 vertical movement of the hopper construction, under the influence of the fluid pressure motor means 68, causes the screw conveyor housing 84 to pivot around the axis of the hinge or pivot 122.

The motive means and mechanism for rotating the screw conveyor 86 disposed within the housing 84 is mounted upon the housing 84. Referring to FIG. 1, there is mounted upon an end member or wall of the conveyor housing 84 a casing 126 which encloses conventional speed reducing gearing (not shown). Projecting in a left-hand direction as viewed in FIG. 1 and journaled in the housing 126 is a shaft 128 equipped with a sheave or pulley 130. The screw conveyor housing 84 is provided with a bracket 132 adjacent its left end, and mounted on the bracket 132 is a motor or motive means 134.

The motor 134 may be fluid operated or may be an electrically energizable motor. Mounted on the motor shaft 136 is a driving sheave or pulley 138, a driving belt 140 being engaged with the pulleys 130 and 138. The drive mechanism for the screw conveyor 86 is movable with the screw conveyor housing 84 when its position is changed by elevation or retraction of the material receiving hopper construction 18.

The material delivered from the screw conveyor into the receiving chute 116 may be transferred to another station for further processing. In the processing of glass batch it is a usual practice to elevate the particulate material to a position for delivery into a glass melting furnace or other glass processing facility. As shown schematically in FIG. 1, the vertical tower or shaft 118 is equipped with a vertically movable bucket elevator 142 of conventional type.

The elevator comprises an endless conveyor belt 144 mounted upon upper and lower rolls, one of which is shown at 146 in FIG. 1. The conveyor belt 144 is equipped with spaced buckets 148 which engage with the particulate material or glass batch in the lower end region 150 of the shaft. The buckets are successively filled with material in the region 150 of the shaft 118 and the material elevated by the buckets to a position (not shown) where the material is transferred to a melting furnace or other processing facility.

The material from a railway hopper car or truck is received from various types of hopper or material delivery means of a carrier or vehicle. As shown in broken lines in FIG. 1, the material discharge chute of a supply carrier may be of various configurations as, for example, the configuration illustrated at 154 or the configuration illustrated at 156. The upper area of the tubular or cellular construction 48 of the invention is adapted to mate with material discharge chutes or outlets including discharge gates of trucks and the like.

The operation of the hopper construction of the invention and associated mechanism is as follows: The hopper construction 18 is normally in a lowermost or retracted position, that is, with the upper surface of the cellular unit 48 on a plane at or below the track rails 14 out of the path of movement of a railway car or truck containing particulate bulk material to be delivered into the hopper construction 18.

After the railway hopper car or a hopper-type truck or other carrier or vehicle containing particulate material is moved to a position wherein the delivery outlet of a discharge chute 154 or 156 is in vertical registration with the cellular unit 48, the operator manipulates a conventional valve means (not shown) to admit pressure fluid, such as oil under pressure, into the cylinders 70 below the pistons 76.

This action moves the hopper construction 18 and its frame members upwardly to the position shown in FIG. 1, in which position the upper surface area of the cellular unit 48 is in engaging relation with the discharge chute or outlet of the material supply carrier. The closure for the discharge chute or outlet is opened and the particulate material from the hopper of the supply carrier flows by gravity through the tubular or cellular unit or assembly 48 into the hopper chamber 58.

The motor 134 is energized and effects rotation of the screw conveyor 86 in a direction to transfer or convey the particulate material from the hopper chamber 58 into the receiving chute 116. Concomitantly with the operation of the screw conveyor drive motor 134, the motive means (not shown) for the bucket elevator 144 is set into operation, the elevator 144 being moved in a direction whereby the buckets 148 engage the particulate material in the base 150 of the shaft 118 and elevate the particulate material to a station for further processing.

The particulate material flowing from the supply carrier into the hopper construction 18 fills the hopper chamber 58 and the material piles up above the hopper chamber 58 in the frusto-conically shaped void or space 53. The material piling up in the void 53 has an angle of repose similar to the angle defined by the lower ends of the varying length tubes 50 forming the frusto-conically shaped void 53 and seals the entrances to these tubes.

The particulate material in the hopper chamber 58 seals the lower ends of the tubes which are open-ended into the corner regions of the hopper construction outside of the void or space 53. In this manner the material delivered into the tubular or cellular construction 48 is not affected by air currents, cross winds or moving air at the region of delivery of the particulate material into the hopper construction 18. The flexible boot 98 provides a sealing means to prevent the escape of any particulate material during flow of the material from the hopper chamber 58 into the housing 84 enclosing the screw conveyor 86.

When the supply carrier, railway car, truck or the like has discharged its load of particulate material, fluid under pressure is admitted into the cylinders 70 above the pistons 76, the fluid pressure moving or retracting the hopper construction 18 downwardly into the pit 10. This action pivots the screw conveyor housing 84 about the axis of the hinge means or pivot 122 to a lowermost position indicated in broken lines in FIG. 1. The batch material flows freely through the multicellular or multitubular unit 48 and the loose material present in the lower end regions of the tubes 50 is effective to seal the cells or tubes and substantially prevent or greatly reduce loss of the particulate material and prevent contamination of the environment.

It is apparent that, within the scope of the invention, modifications and different arrangements may be made other than as herein disclosed, and the present disclosure is illustrative merely, the invention comprehending all variations thereof.

I claim:

1. Apparatus for receiving particulate material from a supply carrier having a material discharge output comprising, in combination, a material receiving hopper construction, said hopper construction including a chamber, an assemblage of a plurality of open-ended cells disposed above the chamber, the cellular assemblage being adapted for registration with the discharge outlet of the supply carrier, the open-ended cells accommodating flow of the particulate material from the discharge outlet into the chamber, the cellular assemblage having a central void defined by the lower ends of certain of the cells of varying lengths, the particulate material in the cells effecting a seal for the cells substantially preventing moving air from entraining the particulate material.

2. Apparatus for receiving particulate material from a supply carrier having a material discharge outlet comprising, in combination, a material receiving hopper construction, said hopper construction including a chamber, a plurality of open-ended tubes in contiguous relation disposed above the chamber, the tubes being adapted for registration with the discharge outlet of the supply carrier, the open-ended tubes accommodating flow of the particulate material from the discharge outlet into the chamber, certain of the tubes being of varying lengths, the lower ends of the tubes of varying lengths defining a central void, the particulate material in the tubes effecting a seal for the tubes preventing moving aif from entraining the particulate material.

3. Apparatus for receiving particulate material from a supply carrier having a material discharge outlet comprising, in combination, a material-receiving hopper construction, said hopper construction including a chamber, an assemblage of a plurality of open-ended cells disposed above the chamber, the cellular assemblage being adapted for registration with the discharge outlet of the supply carrier, the open-ended cells accommodating flow of the particulate material from the discharge outlet into the chamber, the multicellular assemblage having a generally conically-shaped void defined by the lower ends of certain of the cells of varying lengths, the particulate material in the cells effecting a seal for the cells preventing moving air from entraining the particulate material.

4. The apparatus according to claim 3 wherein the cells at the central region of the assemblage are of short length rendering the conically-shaped void of truncated cone shape.

5. Apparatus for receiving particulate material from a supply carrier having a material discharge outlet comprising, in combination, a material receiving hopper construction, said hopper construction including a chamber, a plurality of open-ended cells disposed above the chamber, the open-ended cells being adapted for registration with the discharge outlet of the supply carrier, the open-ended cells accommodating flow of the particulate material from the discharge outlet into the chamber, certain of the cells being of varying lengths, the lower ends of the cells of varying lengths defining a conically-shaped void, the angle of the conically-shaped void simulating the angle of repose of the particulate material piling up in the chamber, the particulate material in the cells effecting a seal for the cells preventing moving air from entraining the particulate material.

6. Apparatus for receiving particulate material from a supply carrier having a material discharge outlet comprising, in combination, a material receiving hopper construction, said hopper construction including a chamber, an assemblage of a plurality of open-ended tubular passages disposed above the chamber, the tubular passages being adapted for registration with the discharge outlet of the supply carrier, the open-ended passages accommodating flow of the particulate material from the discharge outlet into the chamber, certain of the passages being of varying lengths, the assemblage of tubular passages having a conically-shaped void defined by the lower ends of the passages of varying lengths, the angle of the conically-shaped void simulating the angle of repose of the particulate material piling up in the chamber, the particulate material in the passages effecting a seal for the passages preventing moving air from entraining the particulate material.

7. Apparatus for receiving particulate material from a supply carrier having a material discharge outlet comprising, in combination, a material receiving hopper construction, said hopper construction including a chamber, an assemblage of members forming a plurality of open-ended passages in contiguous relation disposed above the chamber, the passages being adapted for registration with the discharge outlet of the supply carrier, the passages accommodating flow of the particulate material from the discharge outlet into the chamber, certain of the passages being of varying lengths, a region of the assemblage of members having a conically-shaped void defined by the lower ends of the passages of varying lengths, the particulate material in the passages effecting a seal for the passages preventing moving air from entraining the particulate material.

8. The apparatus according to claim 7 wherein the angle of the conically-shaped void defined by the lower ends of the passages of varying lengths simulates the angle of repose of the particulate material piling up in the chamber.

9. The apparatus according to claim 7 wherein the passages at the central region of the assemblage are of short length whereby the conically-shaped void simulates a truncated cone.

10. The apparatus according to claim 7 wherein the passages of assemblage are of substantially square cross section.

11. The apparatus according to claim 7 wherein the passages of square cross section are in the dimensional range of about two inches and six inches on a side.

12. The apparatus according to claim 7 wherein the passages are about four inches on a side.

13. The apparatus according to claim 7 wherein the members forming the passages are tubes of square cross section secured together in contiguous relation.

14. Apparatus for receiving particulate material from a supply carrier having a material discharge outlet comprising, in combination, a material receiving hopper construction, said hopper construction including a frame structure, means providing a hopper chamber mounted on the frame structure, an assemblage of a plurality of open-ended cells disposed above the hopper chamber, said hopper frame construction being mounted for vertical movement, motive means for elevating and retracting the hopper frame construction, said hopper frame construction in its uppermost position registering cells of the assemblage with the discharge outlet of the supply carrier, a tubular housing having an entrance adjacent one end in communication with the hopper chamber for receiving particulate material from the chamber, the other end region of said tubular housing being supported for movement about a transverse axis, means articulately connecting the tubular housing with the hopper frame construction, a rotatable screw conveyor journaled in the tubular housing for conveying material away from the hopper chamber, a flexible sealing boot between the hopper chamber and the material entrance region of the tubular housing, a motor mounted by the tubular housing for rotating the screw conveyor, said motive means being adapted to retract the hopper and frame construction when the particulate material in the supply carrier is exhausted.

15. The apparatus according to claim 14 wherein certain of the cells of the assemblage are of varying lengths, the lower ends of the cells of varying lengths defining a conically-shaped void, the angle of the conically-shaped void simulating the angle of repose of the particulate material piling up in the hopper chamber, the particulate material in the cells effecting a seal for the cells preventing moving air from entraining the particulate material.

16. The apparatus according to claim 15 wherein the cells at the central region of the assemblage are of short length whereby the conically-shaped void is in the shape of a truncated cone.

17. The method of receiving particulate material from a supply carrier having a material discharge outlet including registering open-ended cells of a multicellular assembly associated with a material receiving hopper chamber with a material discharge outlet of the supply carrier wherein cells of the assembly are configurated to provide a conically-shaped void in communication with the hopper chamber, flowing the particulate material from the supply carrier into the hopper chamber through the conically-shaped void and cells of the assembly, and sealing the cells by the particulate material in the cells thereby substantially preventing moving air from entraining the particulate material.

18. The method of receiving particulate material from a supply carrier having a material discharge outlet including registering open-ended cells of a multicellular configuration of a material receiving hopper with the discharge outlet of the supply carrier wherein the multicellular configuration has a conically-shaped void the angle of which simulates the angle of repose of a normal pile of the particulate material, flowing particulate material from the supply carrier into the hopper through the conically-shaped void and cells of the multicellular configuration, and sealing the cells by the particulate material in the cells thereby substantially preventing moving air from entraining the particulate material and contaminating the ambient environment.

19. The method of receiving particulate material from a supply carrier having a material discharge outlet including a material receiving hopper chamber associated with a multicellular assemblage of open-ended cells wherein the multicellular assemblage is configurated with a conically-shaped void, elevating the multicellular assemblage and the material receiving hopper chamber, registering cells of the multicellular assembly with the material discharge outlet of the supply carrier, flowing particulate material from the discharge outlet of the supply carrier into the hopper chamber through the conically-shaped void and cells of the assemblage, sealing the cells by the particulate material preventing moving air from entraining the particulate material, and retracting the multicellular assembly and receiving hopper to an out-of-use position when the supply of particulate material in the supply carrier is exhausted.

* * * * *